(12) United States Patent
Cummings et al.

(10) Patent No.: US 11,858,285 B2
(45) Date of Patent: Jan. 2, 2024

(54) DYE SUBLIMATION INK COMPOSITION AND PROCESSES FOR USE WITH STAMP PADS

(71) Applicant: Esprix Technologies, LP., Sarasota, FL (US)

(72) Inventors: Mark W. Cummings, Bradenton, FL (US); Jana Petrova, Ellenton, FL (US); Mandy Smith, North Port, FL (US); Paula S. Smith, Sarasota, FL (US); Tonya N. Tremitiere, Bradenton, FL (US); John F. Cooper, Hendersonville, NC (US)

(73) Assignee: Esprix Technologies, LP., Sarasota, FL (US)

( * ) Notice: Subject to any disclaimer, the term of this patent is extended or adjusted under 35 U.S.C. 154(b) by 315 days.

(21) Appl. No.: 17/296,400

(22) PCT Filed: Nov. 26, 2019

(86) PCT No.: PCT/US2019/063215
§ 371 (c)(1),
(2) Date: May 24, 2021

(87) PCT Pub. No.: WO2020/112747
PCT Pub. Date: Jun. 4, 2020

(65) Prior Publication Data
US 2022/0009261 A1  Jan. 13, 2022

Related U.S. Application Data

(60) Provisional application No. 62/917,159, filed on Nov. 26, 2018, provisional application No. 62/920,613, filed on May 9, 2019.

(51) Int. Cl.
| | | |
|---|---|---|
| B41M 5/00 | (2006.01) | |
| B41M 5/035 | (2006.01) | |
| B41K 1/54 | (2006.01) | |
| B44C 1/17 | (2006.01) | |
| B44C 1/24 | (2006.01) | |
| C09D 11/033 | (2014.01) | |
| C09D 11/037 | (2014.01) | |

(52) U.S. Cl.
CPC .............. B41M 5/035 (2013.01); B41K 1/54 (2013.01); B44C 1/1712 (2013.01); B44C 1/24 (2013.01); C09D 11/033 (2013.01); C09D 11/037 (2013.01)

(58) Field of Classification Search
CPC ........ B41M 5/035; B41K 1/54; B44C 1/1712; B44C 1/24; C09D 11/033; C09D 11/037
USPC ..................................................... 8/471, 473
See application file for complete search history.

(56) References Cited

U.S. PATENT DOCUMENTS

| | | | |
|---|---|---|---|
| 4,062,644 A | 12/1977 | Sponaes et al. | |
| 4,082,467 A | 4/1978 | Kaplan | |
| 4,202,663 A * | 5/1980 | Haigh | B29C 49/52 156/289 |
| 4,211,528 A | 7/1980 | Cuvelier | |
| 4,281,999 A | 8/1981 | Becker et al. | |
| 4,543,102 A | 9/1985 | Defago et al. | |
| 4,689,078 A | 8/1987 | Koike et al. | |
| 4,713,081 A | 12/1987 | Becker | |
| 4,725,849 A | 2/1988 | Koike et al. | |
| 4,923,848 A * | 5/1990 | Akada | B44C 1/1716 347/213 |
| 4,969,951 A | 11/1990 | Koike et al. | |
| 5,006,502 A * | 4/1991 | Fujimura | B41M 5/345 503/227 |
| 5,028,262 A | 7/1991 | Barlow, Jr. et al. | |
| 5,043,013 A | 8/1991 | Kluger et al. | |
| 5,488,907 A | 2/1996 | Xu et al. | |
| 5,642,141 A | 6/1997 | Hale et al. | |
| 5,672,021 A | 9/1997 | Abber et al. | |
| 5,704,968 A * | 1/1998 | Taira | B41K 1/32 106/31.4 |
| 5,885,020 A | 3/1999 | Rossi | |

(Continued)

FOREIGN PATENT DOCUMENTS

| | | |
|---|---|---|
| CN | 102040882 A | 5/2011 |
| CN | 102127333 A | 7/2011 |

(Continued)

OTHER PUBLICATIONS

Burch, "Dyeing Polyester with Disperse Dyes," Jan. 15, 2014; Retrieved from http://www.pburch.net/dyeing/dispersedye.shtml on Mar. 4, 2019, 8 pages.

(Continued)

*Primary Examiner* — Eisa B Elhilo
(74) *Attorney, Agent, or Firm* — Dinsmore & Shohl LLP; Weston R. Gould

(57) ABSTRACT

Provided are processes of applying a decorative imaging to a substrate that includes providing a stamp pad comprising a child and environmentally friendly disperse dye composition, inking a stamp with the disperse dye composition, optionally transferring the disperse dye composition from the stamp to an intermediate ink receptive surface using the rubber stamp to thereby place an image on an intermediate ink receptive surface, and transferring the image to a dye receptive object by application of sufficient heat and pressure. The disperse dye compositions provided herein are safe, environmentally friendly, and able to be used in stamp pad imaging processes.

20 Claims, No Drawings

(56) References Cited

U.S. PATENT DOCUMENTS

| | | |
|---|---|---|
| 5,909,978 A | 6/1999 | Giordano et al. |
| 6,117,260 A | 9/2000 | Rossi |
| 6,561,713 B2 | 5/2003 | Sukhna et al. |
| 6,607,565 B1 | 8/2003 | Herrmann et al. |
| 6,881,000 B2 | 4/2005 | Perlman et al. |
| 7,208,036 B2 | 4/2007 | Fukuo et al. |
| 7,234,805 B2 | 6/2007 | Maekawa et al. |
| 7,507,283 B2 | 3/2009 | Akatani et al. |
| 7,641,328 B2 | 1/2010 | Maekawa et al. |
| 8,425,029 B2 | 4/2013 | Xu |
| 8,709,103 B2 | 4/2014 | Oguchi |
| 8,852,122 B2 | 10/2014 | Mao et al. |
| 9,040,623 B2 | 5/2015 | Akatani et al. |
| 9,222,217 B2 | 12/2015 | Ikeda et al. |
| 9,315,681 B2 | 4/2016 | Xu |
| 9,340,694 B2 | 5/2016 | Oura et al. |
| 9,534,128 B2 | 1/2017 | Oguchi et al. |
| 9,682,571 B2 | 6/2017 | Ikeda et al. |
| 9,683,115 B2 | 6/2017 | Tabayashi et al. |
| 9,695,296 B2 | 7/2017 | Oguchi et al. |
| 9,708,496 B2 | 7/2017 | Xu |
| 9,708,499 B2 | 7/2017 | Miyajima |
| 9,732,466 B2 | 8/2017 | Oguchi et al. |
| 10,052,866 B2 | 8/2018 | Cooper et al. |
| 10,151,062 B2 | 12/2018 | Zhao et al. |
| 10,525,756 B2 | 1/2020 | Wei et al. |
| 10,669,440 B2 | 6/2020 | Tremitiere et al. |
| 2009/0189968 A1 | 7/2009 | Yokozawa |
| 2010/0043152 A1 | 2/2010 | Terao et al. |
| 2011/0297040 A1 | 12/2011 | Chen et al. |
| 2015/0152591 A1 | 6/2015 | Asami |
| 2016/0208435 A1 | 7/2016 | Oguchi et al. |

FOREIGN PATENT DOCUMENTS

| | | | |
|---|---|---|---|
| CN | 103232749 A | 8/2013 | |
| KR | 10-2006-0080830 A | 7/2006 | |
| KR | 2006080830 A * | 7/2006 | ............... B41K 1/54 |
| WO | WO2019133691 A1 | 7/2019 | |

OTHER PUBLICATIONS

English translation of CN 102040882, May 2011; 5 pages.
Search Report from PCT/US2018/067645, dated Mar. 28, 2019; 4 pages.
Written Opinion of the International Search Authority dated Mar. 28, 2019 for PCT/US2018/067645; 10 pages.
Disperse Yellow 23, https://chem.nlm.nih.gov/chemidplus/rn/6250-23-3; no date available; 2 pages.
Jacquard Products, "Sublimation Transfer Printing with Jacquard's iDye Poly," Mar. 8, 2012.
Jacquard Products, "50/50 Dyeing with iDye Natural and iDye Poly," Jul. 30, 2012.
Extended European Search Report for European Patent Application No. 18896761.6, dated Sep. 3, 2021.

* cited by examiner

US 11,858,285 B2

DYE SUBLIMATION INK COMPOSITION AND PROCESSES FOR USE WITH STAMP PADS

CROSS-REFERENCE TO RELATED APPLICATIONS

This application is a National Stage Entry under 35 U.S.C. § 371 of International Patent Application No. PCT/US2019/063215, filed Nov. 26, 2019, which depends from and claims priority to U.S. Provisional Application 62/917,159 filed Nov. 26, 2018, and U.S. Provisional Application 62/920,613 filed May 9, 2019, the entire contents of each of which are incorporated herein by reference.

FIELD

This disclosure related to disperse dye sublimation ink composition and their use with stamp pads and stamp pad processes of imaging a desired object.

BACKGROUND

Disperse dye inks have been known for at least 75 years. For example, U.S. Pat. No. 4,062,644 discloses a transfer ink to be used with a felt tip pen. U.S. Pat. No. 4,082, also discloses a felt-tip marker pen and dye dispersion of vaporizable disperse dyes. In the '467 patent the dye is first dispersed with linseed oil and includes 40-50% of a soluble resin such as hydrogenated resin. This dispersion is then diluted with water, additional soluble resin and 80-90% of a polyalcohol. U.S. Pat. No. 4,211,528 also discloses use of sublimable disperse dyes in felt-tip marker pens wherein the inventors formulate a solution rather than a dispersion of the disperse dye particles. This was accomplished by use of chlorinated solvents that are environmentally unfriendly and would not be accepted in today's commercial market.

Disperse dye-based sublimation ink compositions are known in the literature, although not for stamp pad use. For example, U.S. Pat. No. 4,725,849 describes a disperse dye composition for inkjet printing directly onto cloth that has been treated with a hydrophilic resin. The particular ink compositions contained 20% or higher concentrations of solvent and this would be undesirable for stamp pads.

Sublimable dye-based ink compositions mentioned in the above referenced patents each suffer from a number of disadvantages if the ink is to be used in a consumer product such as a stamp pad. First, they must be designed to be toxicologically and environmentally safe, be non-irritant, and preferably provide a negative Ames test. The vast majority of chemicals used to produce commercially available dry toners would produce a negative Ames Test. This is not necessarily the case with many sublimation solvent and disperse dyes that can have functional groups or even contaminants from their production that can result in their exhibiting a positive Ames Test.

A second issue with prior materials is the use of solvents and chemicals that are now considered either toxic or environmentally unfriendly. A third issue is the stability of the ink compositions. It is difficult to maintain long-term dispersion of pigment-based disperse dye sublimation inks. If the dye particles aggregate the inks will not print consistently. A fourth issue relates to maintaining an environmentally friendly solvent mixture that will not dry prematurely. A fifth issue is formulating an ink with the proper viscosity such that the ink is wicked at a desired rate but not so low that the ink will puddle when it first contacts the substrate. Typically inks designed for inkjet application have relatively low viscosities and are not suitable for stamp pad use. A sixth issue is the inclusion of polymer components where the polymer can soften and adhere to the decorated item. A seventh issue particularly related to inkjet inks is the inclusion of certain specialty chemicals necessary for proper long-term operation of ink jet pens but not required or desired for the disclosed application. An eighth issue is the percentage of water in the composition. It is desirable for the ink to be primarily aqueous based, but this is not the case with most industrial use inkjet inks. It should be readily apparent that for broad consumer use, especially with children, the chemical composition criteria of the sublimation inks will necessarily be more stringent than for commercial or industrial inkjet sublimation inks.

As such, there is a need for new sublimable dye-based ink compositions that can be used with stamp-pad processes and be environmentally safe. The compositions as provided in this disclosure address the forgoing issues by providing sublimable dye-based compositions that are both Ames negative and are of appropriate physical characteristic to be useful for stamp pad applications.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided herein are processes of placing an image on a surface that includes: providing a stamp pad comprising a child and environmentally friendly disperse dye composition; inking a stamp with the disperse dye composition; transferring the disperse dye composition from the stamp to an intermediate ink receptive surface using the stamp to thereby place an image on an intermediate ink receptive surface; and transferring the image to a dye receptive object by application of sufficient heat and pressure.

Also provided are disperse dye compositions that include one or more disperse dyes wherein the composition may have a viscosity more than 10 cps, optionally more than 20 cps. A particle size of the disperse dye may be less than 350 nm, optionally less than 150 nm. The disperse dye composition may further include one or more of any combination of dispersants, cosolvents, biocides, pH adjusters, defoamers, or surfactants. Optionally, the disperse dye composition is child an environmentally friendly, optionally a disperse dye composition meets the standards for child safety use as defined by ASTM-D4236 and EN-71.

DETAILED DESCRIPTION

Provided are processes of using a disperse dye composition containing stamp pad to deposit a heat transfer dye ink onto an intermediate substrate. The processes and stamp pads provided herein overcome prior issues by providing a functional and environmentally friendly system for allowing custom decorating of objects or surfaces. The processes utilize a stamp pad whereby a stamp, illustratively a rubber or other material stamp as is recognized in the art, is used to transfer a disperse dye composition to an intermediate substrate for subsequent transfer to a dye receptive object by application of sufficient heat and/or pressure. In general, the structure and materials forming stamp pads are known in the art and are stamps where by an ink composition is delivered from the stamp pad to a substrate or surface.

The processes as provided utilize a stamp to deliver ink from a stamp pad to an intermediate substrate whereby the disperse dye ink is in the form of an image. Optionally, an intermediate substrate is plain paper, although the processes are suitable for many other substrates that could include, but not be limited to: coated papers, plastic films, or metal sheets. The image may be optionally dried on the intermediate substrate. The disperse dye composition is transferred from a stamp pad to a stamp by contacting the stamp face with the stamp pad to thereby ink the stamp. The stamp is then contacted to an intermediate ink receptive surface. The imaged intermediate substrate is contacted on or directly on a surface or object to be decorated and heat applied such as via an iron, hot plate, heat transfer press or similar device or process such that the heat transfer dye is transferred from the intermediate substrate to the surface or object. The surface or object to be decorated optionally has a surface or composition that is receptive to sublimation dyes present in the ink. For example, the surface or object is optionally a textile that is receptive to these dyes or object that is coated with a polymer that is receptive to the dyes. Examples of polymers that may be receptive to heat transfer dyes of the disclosure include but are not limited to certain polyester, epoxy and polyamide polymers. In some aspects, the dye transfer requires a specific combination of heat, pressure and time to achieve the desired level of optical density.

In some aspects, the dye transfer is performed at a transfer temperature of 250° F. to 400° F. Optionally the transfer temperature is at least 250° F., optionally at least 275° F., optionally at least 300° F., optionally at least 325° F., optionally at least 350° F., optionally at least 375° F., optionally at least 400° F. Optionally, a transfer temperature does not exceed 400° F. In practice use of higher temperature requires less time to transfer a sufficient amount of dye. The exact amount of pressure will vary depending on the substrate to be decorated. Substrates with smooth surfaces will utilize lower pressure than a substrate with texture surface.

Also provided are processes of using a stamp to transfer a disperse dye composition from a stamp pad to deposit the disperse dye composition as provided herein directly onto an object that has a dye-receptive surface such as a polymer coated ceramic tile or other object. Optionally, a nonporous, non-ink receptive, heat resistant material is placed directly on the disperse dye composition image and the dye transferred as in is described above.

Rubber stamp pads as are commonly used by the craft industry for diverse decorating applications are useful herein. A typical construction may include a pad to hold the specific ink and an image-based rubber applicator. The applicator is inked and the image transferred to a surface such as paper, plastic, wood, etc. Requirements for the ink fluid would include suitable fluidity, ability to adhere to the rubber surface but be easily released from the surface, and resistance to premature drying.

Stamp pad inks fluids are usually based on water with limited use of water miscible solvents such as alcohols and glycerin. The colorant is usually a dye that is soluble in the fluid system. Additional components could include surfactants to adjust viscosity and biocides to prevent mold. Pigment-based stamp pad inks are provided where improved light stability is desired and for those inks a pigment dispersant is probably required. Disperse or sublimation dye inks would have the characteristics of pigment inks where the disperse dye is insoluble in the fluid matrix.

The processes as used herein employ a novel disperse dye composition that is suitable for use in a stamp pad application. As such, also provided in this disclosure are sublimable dye-based ink compositions (disperse dye composition) that are have the appropriate physical properties for use in stamp-pad applications, but are also environmentally safe and non-toxic to users. The inventors determined that many of the sublimation toner patents mentioned above and otherwise known in the art include disperse dyes that result in toners that provide a positive Ames test. To solve this problem the inventors have researched both the type and concentration of disperse dye and the effect on Ames Test, as well as place these materials in a dye composition that has the appropriate physical properties to be useful in a stamp pad application.

The Ames test was developed by Professor Bruce Ames in the 1970s as a convenient method of determining if a chemical poses a potential mutagenic hazard. The test uses different strains of bacteria to predict probabilities of a compound to cause DNA mutations. Although a positive Ames test in itself does not mean that an ink is necessarily harmful to humans, it can create a negative perception by users of such a product. A good reference to Ames test and imaging materials can be found in Peter Gregory's publication Chemistry and Technology of Printing and Imaging Systems. Some disperse dyes mentioned in earlier patents are not Ames negative.

Relative to prior disperse dye compositions that may be considered child and environmentally safe, the disperse dye compositions provided herein are specifically suited for use with stamp pads. Specifically, the present disperse dye compositions not only include the Ames negative safety parameters, but also possess tailored ink viscosities, flow, etc. so as to prevent ink drying in or on the stamp pad. The inventors of this disclosure accomplished this feat through the use of appropriate concentrations of water-miscible cosolvents such as, for example, glycerin or propylene glycol as well as optional suitable surfactants. Wetting agents may also be included for adhesion of the ink to the rubber stamp portion. The specific dye concentration may be less than for typical ink jet inks as the higher stamp pad ink viscosity results in higher ink lay down on a substrate.

A child and environmentally friendly sublimable disperse dye heat transfer ink composition as provided herein includes one or more disperse dyes. The number and identity of the disperse dyes yields the resulting color of the dye composition. For example, there is no pure black disperse dye. Instead mixtures of different dyes must be used to achieve the desired hue and density of the dyed image. This mixture might include cyan, magenta and yellow dyes. Or it might include a blue plus orange, brown or some combination of those. A similar situation exists for selecting magenta, yellow or cyan dye mixtures that will provide the desired full color transferred image. It has also been discovered by the inventors that one dye by itself might be Ames positive but when used at low concentration within a toner will produce an Ames negative toner.

As such, provided are disperse dye compositions suitable for use in a stamp pad that include one or more disperse dyes where the disperse dye composition exhibits a negative Ames test with strains TA98 and TA100. The inventors found that specific combinations of disperse dyes at desirable concentrations or single dyes that are themselves Ames negative and/or when used at specific concentrations when in a final disperse dye composition can yield excellent color transfer results as well as create a toner that is Ames test negative in both TA98 and TA100. Optionally, a disperse dye composition includes one disperse dye. Optionally, a disperse dye composition includes two or more disperse dyes. Optionally, a disperse dye composition includes 1, 2, 3, 4, 5, 6, 7, 8, 9, 10 or more disperse dyes.

Illustrative examples of disperse dyes that may be used in some aspects of a disperse dye composition as provided herein include but are not limited to Disperse Yellow 3 (CAS 2832-40-8), Disperse Yellow 23 (CAS 6250-23-3), C.I. Disperse Yellow 27 (CAS 73299-30-6), Yellow 54 (CAS 12223-85-7), Yellow 82 (CAS 27425-55-4), Yellow 119 (CAS 57308-41-5), Disperse Orange 1 (CAS 2581-69-3), Disperse Orange 3 (CAS 730-40-5), Orange 25 (CAS 31482-56-1), Red 1 (CAS 2872-52-8), Red 4 (CAS 2379-90-0), Disperse Red 9 (CAS 82-38-2), Red 11 (CAS 2872-48-2), Disperse Red 13 (CAS 3180-81-2), Red 60 (CAS 17418-58-5), Red 364 (CAS 522-75-8), Disperse Violet 1 (CAS 128-95-0), Violet 17 (CAS 12217-92-4), Disperse Blue 3 (CAS 2475-46-9), Blue 14 (CAS 2475-44-7), Blue 19 (CAS 4395-65-7), Blue 60 (CAS 12217-80-0/56548-64-2), Blue 72 (CAS 12217-81-1), Blue 359 (CAS 62570-50-7), Blue 360 (CAS 885474-63-5), and Brown 26 (optionally as available from AAKASH CHEMICALS), or any combination thereof.

In some aspects, particular combinations of disperse dyes are used in a disperse dye composition. Optionally, a composition includes Yellow 54, Orange 25, Blue 60, Blue 72, Red 60, and Violet 17.

Optionally, a disperse dye composition includes Red 60 and Violet 17. Optionally, the Red 60 is present at 2 to 6 wt %. Optionally, the violet 17 is preset at 0 to 3 wt %. Optionally, the toner composition includes from 2 to 6 wt % Red 60 and from 0 to 3 wt % Violet 17.

In some aspects a disperse dye composition is a yellow composition that includes one or more disperse dyes so as to impart a yellow color to the composition. Optionally, a yellow disperse dye composition includes as a disperse dye Yellow 54. Yellow 54 is optionally present at 1 to 5 wt %.

In other aspects, a disperse dye composition is a cyan disperse dye composition. Optionally a cyan disperse dye composition includes one or more disperse dyes the combination of which imparts a cyan color to the disperse dye composition. Optionally, a cyan disperse dye composition includes as disperse dyes Blue 60, Blue 72, or combinations thereof. Optionally, a cyan toner includes 0 to 3 wt % Blue 60 and from 0 to 3 wt % Blue 72.

In some aspects, a disperse dye composition includes one or more disperse dyes so as to impart a black color to the disperse dye composition. A black disperse dye composition optionally includes one or more of Violet 17, Yellow 54, Orange 25, and Blue 72. Optionally, the disperse dye composition includes 0 to 0.2 wt % Violet 17, from 1 to 2 wt % Yellow 54, from 1 to 2 wt % Orange 25, and from 5 to 8 wt % Blue 72.

In some aspects a disperse dye composition includes a single disperse dye. Optionally, a single disperse dye is Blue 60. Blue 60 is optionally present at 1 to 5 wt %, optionally 3 wt %.

The disperse dye compositions as provided herein are not limited to specific disperse dyes and could include or exclude ones that are typically used to decorate textile fibers of coated novelty items. Optionally, the disperse dyes are free of impurities and toxic components and are environmentally friendly. Optionally, one or more of the disperse dyes used in a composition as provided herein that pass an AMES test for potential mutagenicity. The while individual disperse dyes when used at different concentrations may not be considered child or environmentally safe, the overall disperse dye compositions as provided herein include one or more disperse dyes at a concentration and/or combination with other compounds that result in an overall disperse dye composition that is child and environmentally safe as measured by conforming to ASTM-D4236 and/or European Toy Safety Directive EN 71. In some aspects, an overall disperse dye composition exhibits a negative Ames test with strains TA98 and TA100.

Optionally, a disperse dye may be modified by chemical treatment such that the treated pigment is self-dispersing in water. The disperse dye may optionally be treated with a silane or titanate compound to aid dispersion stability. Techniques for chemical treatment or encapsulating of dyes for improved dispersion are well known in the art.

Optionally, a disperse dye composition includes one or more additional non-sublimable dye or color pigments. One disadvantage of disperse dyes is that they have a particular hue when printed on a paper substrate. However, when transferred to the final object the hue and brightness can be significantly different. A solution to this issue is to include in the disperse dye composition a dye or color pigment that has a hue more representative of the heat transferred image but is not sublimable. Suitable non-sublimable colorants could include FDA approved food dyes or color pigments typically used in commercial inks, with the understanding that inks produced with these additional colorants must still meet the requirements under ASTM D4236 and/or EN 71. These colorants could be included during the initial disperse dye dispersion process or they could be added either as an aqueous solution or pigment dispersion during the final ink mixing process.

A disperse dye composition for use herein requires more than the selection and/or concentration of disperse dye or combinations thereof, but such disperse dye compositions must also have the appropriate physical characteristics to enable their use with stamp pads. In some aspects, a disperse dye composition has an appropriate viscosity.

A disperse dye composition as provided and used herein optionally has a desired viscosity as measured by a standard viscosity analyzer as used in the art. A disperse dye composition optionally has a viscosity of at or greater than 10 centipoise (cps) at 25° C. Optionally, a disperse dye composition has a viscosity at or above 15 cps, optionally at or above 20 cps, optionally at or above 30 cps. Optionally, a disperse dye composition has a viscosity that is optionally at or above 11 cps, 12 cps, 13 cps, 14 cps, 15 cps, 16 cps, 17 cps, 18 cps, or 19 cps.

Preparation of the disperse dye compositions as provided herein is similar to that typically used in the art. The disperse dye is typically milled with a type and quantity of water and dispersant required to produce a particle size dispersion that once combined with additional ink components will provide a dye dispersion that will remain in a stable dispersed form for an extensive time period even under varying environmental conditions.

The disperse dyes in the disperse dye composition is provided as a particulate material with a particle size. Particle size is that measured by a standard particle size analyzer as an equivalent sphere particle size (D50). A particle size of a dye particle is optionally from 5 nanometers (nm) to 400 nm, or any value or range therebetween. Optionally, a particle size is 5 nm to 150 nm, 5 nm to 350 nm, optionally 5 nm to 200 nm, optionally 10 to 350 nm, optionally 20 to 350 nm. Optionally, a particle size is less than 350 nm, optionally less than 300 nm, less than 250 nm, less than 200 nm, less than 150 nm, or less than 100 nm. The particular technique used to mill the dye particles can be one common to the pigment milling industry and could include (for example) ball mills, attritors, or continuous media mills.

In forming an ink as provided herein, the disperse or solvent dye (pigment, or heat transfer dye as used herein) may be first milled with water and optionally a dispersant to produce a pigment concentrate of 10% to 30% by weight pigment and with the desired pigment average particle size optionally of 5 to 400 nm.

The disperse dye composition optionally includes water. Water is optionally purified or otherwise treated by techniques known in the art so as to be free or substantially free of undesirable impurities. The final concentration of water in the disperse dye composition is optionally less than 50% by weight water, optionally 20% to 50% by weight water.

A disperse dye composition as provided herein optionally includes one or more biocides. A biocide is optionally present at 0% to 1% by weight or any value or range therebetween. Optionally, a biocide is present at less than 1 wt %. Optionally, a biocide is present at from 0.01 to 1% by weight, optionally 0.01% to 0.5% by weight, optionally 0.01% to 0.2% by weight. Illustrative examples of a biocide that may be included in a disperse dye composition include but are not limited to quaternary ammonium salts derived from hexamethylenetetramine such as 1-(3-chloroallyl)-3,5,7-triaza-1-azoniaadamantane chloride (Dowicil 75), or other such molecules.

Optionally, a disperse dye composition includes a dispersant suitable for dispersing a disperse dye (e.g. pigment dispersant). If a dispersant is used, the quantity and specific type will depend on the chemistry of the particular disperse dye and could range (typically) by weight from 0.1 to 50% of the weight of pigment or the overall disperse dye composition. A dispersant is optionally present from 0.5 wt % to 50 wt %, optionally 0.1 to 10 wt %, optionally 0.1 to 5 wt %. The specific dispersant is limited to one that provides the desired pigment dispersion stability and also meets the environmental and safety criteria as described above. Optionally, a dispersant includes but is not limited to polymeric acrylic acids, oxazolines, ethoxylated compounds, silanes, titanates, and block and graft polymers. Optionally, the type of dispersant is one not based on a polymer and could include organic compounds with polar functional groups such as carboxylic acid, ammonium, polyoxyethylene, or sulfonate. Oxalic and citric acid are two specific examples. Additional ink components, if desired, could be included during the process of preparing the dye dispersion or alternatively added during dilution of the dispersion.

In some aspects, an ink composition includes one more cosolvents or humectant(s) that are water-miscible solvent or mixture of solvents. The cosolvent(s) or humectant(s) optionally reduces evaporation and prevents premature ink drying on the stamp pad. The total quantity of water-miscible cosolvents or humectants may be in the 0.5 to 75% by weight range, optionally in the 0.5% to 70% by weight, optionally in the 10% to 70% by weight, optionally 10% to 30% by weight. Examples of suitable co-solvents or humectants include alcohols such as ethanol or isopropanol, glycols such as polyethylene or polypropylene, polyethylene glycol, propylene glycol, glycerin, diols such as propanediol or pentanediol, dimethyl sulfoxide, or bio-derived solvents based on lactic acid. Optionally, a cosolvent may also act as a viscosity modifier. Any suitable composition imparting the desired safety characteristics to the ink composition and will result in the desired viscosity as described herein may be used as a cosolvent. Optionally, a cosolvent is a polyethylene glycol of molecular weight less than 5000 Da that will contribute to a low viscosity ink. Optionally, PEG is less than 4000 Da, optionally less than 3500 Da, optionally less than 3000 Da.

The ink may also include additional modifying components such as pH adjusters or surfactants. Illustrative examples of surfactants include but are not limited to Dioctyl sulfosuccinate sodium salt (Aerosol OT-100), nonylphenol ethoxylatse (e.g. Tergitol NP-9 and NP-30), triethanolamine, and polyethylene glycol p-(1,1,3,3-tetramethylbutyl)-phenyl ether (Triton X-100). A surfactant may be present at 0 wt % to 5 wt %, optionally 0.01 wt % to 1 wt %, optionally 0.1 wt % to 2 wt %. Optionally, a surfactant is triethanolamine at 0.1 wt % to 2 wt %.

A disperse dye composition optionally has a pH of 6.5 to 8. This pH may be achieved by the inclusion of one or more pH adjusters, such as acids or bases depending on the desired pH of the system and other components therein. Optionally, a pH adjuster is or includes a buffering agent. Optionally, a pH adjuster is excluded.

A disperse dye composition optionally includes a defoamer. Illustrative examples of defoamers include but are not limited to silicone based anti-foam compounds such as TEGO Antifoam 1-85 and BYK-017, and mineral or vegetable oil based defoamers such as TRAMFLOC 11271GA and AV1525. Optionally, a defoamer is excluded. Defoamers, if present, may be presented at 0.01 wt % to 10 wt %, or greater. In some aspects, a defoamer also serves as a pH adjuster. In such circumstances, a separate pH adjuster that does not serve a defoaming function is optionally absent.

Each of these chemical components, if used, optionally meets the same environmental and safety criteria as mentioned for the remainder of the disperse dye composition. Although not required for the successful operation of the disperse dye compositions as provided herein, an additional FDA approved dye or consumer friendly color pigment is optionally included in the disperse dye composition. Additional modifying components could be included during the process of preparing the dye dispersion or alternatively added during dilution of the dispersion.

Following preparation of the disperse dye as a dispersion, the above dispersion is then diluted with water, co-solvents and additional ink components such that the final dye concentration will optionally be in the 1% to 20% by weight, optionally 2% to 20% by weight depending on the particular dye and its tinctorial strength. The final concentration of water is optionally 30% to 60% by weight of the total disperse dye composition. A secondary water-miscible solvent or mixture of solvents is used to reduce evaporation and prevent premature disperse dye composition drying. The total quantity of water-miscible cosolvents is optionally in the 40-70% range. Examples of suitable cosolvents include alcohols, glycols, glycerin, and pyrrolidine. The disperse dye composition may also include additional components such as pH adjusters, surfactants, biocides, viscosity modifiers, defoamers and light stabilizers.

Optionally, a disperse dye composition includes 2 wt % to 10 wt % disperse dye, 0 wt %-5 wt % dispersant, 0 wt % to 30 wt % propylene glycol, 0 wt % to 25 wt % glycerin, 0 wt % to 14 wt % polyethylene glycol, 0 wt % to 4 wt % poly(2-ethyl-2-oxazoline) (Aquazol), and 0 wt % to 4 wt % other additives, with the composition including 0 wt % to 98 wt % water.

In some aspects, a disperse dye composition optionally excludes one or more solvents, oils or resins. Illustrative solvents, oils or resins optionally excluded include but are not limited to: chlorinated solvents, linseed oil; hydrophilic resins; $C_1$-$C_4$ alkyl alcohols, e.g. methanol, ethanol, n-propanol, isopropanol, n-butanol, sec-butanol, tert-butanol, and iso-butanol; amides, e.g. dimethylformamide and dimethylacetamide; ketones or keto alcohols, e.g. acetone and diacetone alcohol; ethers, e.g. tetrahydrofuran and dioxane; polyalkylene glycols, e.g. polyethylene glycol and polypropylene glycol; alkylene glycols having 2 to 6 carbon atoms in the alkylene group, e.g. ethylene glycol, propylene glycol, butylene glycol, triethylene glycol, 1,2,6-hexanetriol, thiodiglcol, hexylene glycol, and diethylene glycol; glycerol; lower alkyl ethers of polyhydric alcohols, e.g. ethylene glycol methyl (or ethyl) ether, diethylene glycol methyl (or ethyl) ether, and triethylene glycol monomethyl (or monoethyl) ether; N-methyl-2-pyrrolidone; and 1,3-dimethyl-2-imidazolidinone.

The disperse dye composition may be loaded into any stamp pad device as are commonly used, such as self-inking stamp pads as described in WO 2005/084953 and US 2004/250719, as well as traditional stamp pads (e.g. as described in U.S. Pat. No. 3,326,180) made of a foam rubber, felt, or other foam material housed in a container. Illustratively, a stamp pad may include a shallow tray closed by a hinged or non-hinged cover and containing a porous pad that includes the disperse dye composition as provided herein. The stamp pad may be saturated, substantially saturated, or otherwise wetted with the disperse ink composition during or following formation of the stamp pad material.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

Example 1

An example of a composition usable for stamp pad sublimation is made by media milling a mixture of 15 grams (g) Disperse Red 60, 5 g styrene acrylic acid-based dispersant and 80 g water to produce a dye dispersion. The dye dispersion was diluted with 30 g PEG 400, 20 g glycerin, 1 g Triton X-100 surfactant, 0.5 g Dowicil 96 biocide and 0.5 g defoamer. The ink was added to a pad of a standard stamp pad so as to be ready for use.

Example 2

A yellow ink dispersion was prepared as in Example 1 above using 10 g Disperse Yellow 54, 80 g water and 2 g naphthalenesulfonic acid polymer sodium salt (Demol N, Kao). This was diluted with 40 g PEG 400, 10 g glycerin, 1 g Aerosol OT-100 and 0.5 g Bioban CS 132 biocide to produce a pad printing ink.

The forgoing description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Various modifications of the present disclosure, in addition to those shown and described herein, will be apparent to those skilled in the art of the above description. Such modifications are also intended to fall within the scope of the appended claims.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular aspects of the invention, but is not meant to be a limitation upon the practice thereof. The following claims, including all equivalents thereof, are intended to define the scope of the invention.

The invention claimed is:

1. A decorative imaging process comprising:
providing a stamp pad comprising a child and environmentally friendly disperse dye composition;

inking a stamp with the disperse dye composition;
transferring the disperse dye composition from the stamp to an intermediate ink receptive surface using the stamp to thereby place an image on an intermediate ink receptive surface; and
transferring the image to a dye receptive object by application of sufficient heat and pressure.

2. The process according to claim 1, wherein the disperse dye composition has a viscosity greater than 10 cps.

3. The process according to claim 1, wherein a disperse dye within the disperse dye composition has a particle size is less than 350 nm.

4. The process according to claim 1, wherein the disperse composition comprises one or more disperse dyes, dispersants, cosolvents, biocides, pH adjusters, defoamers, surfactants, or any combination thereof.

5. The process according to claim 4 where the cosolvent is water miscible and is chosen from the group consisting of alcohols, glycerin, and glycols.

6. The process according to claim 4 where the cosolvent is selected from the group consisting of polyethylene glycol, polypropylene glycol, and glycerin.

7. The process according to claim 4, wherein the disperse dye is selected from a group consisting of Disperse Yellow 3, Disperse Yellow 23, Disperse Yellow 27, Disperse Yellow 54, Disperse yellow 82, Disperse Yellow 119, Disperse Orange 1, Disperse Orange 3, Disperse Orange 25, Disperse Red 1, Disperse Red 4, Disperse Red 9, Disperse Red 11, Disperse Red 13, Disperse Red 60, Disperse Violet 1, Disperse Violet 17, Disperse Blue 3, Disperse Blue 14, Disperse Blue 19, Disperse Blue 60, Disperse Blue 72, Disperse Blue 359, Disperse Blue 360, and any combination of two or more thereof.

8. The process according to claim 1, wherein the disperse dye composition also includes from up to 10% of an additional colorant chosen from non sublimable consumer and environmentally friendly dyes and color pigments.

9. A process according to claim 1, wherein the disperse dye composition meets the standards for child safety use as defined by ASTM-D4236 and EN-71.

10. The process according to claim 1, wherein the disperse dye composition comprises from 2% to 20% by weight of one or more disperse dyes, from 0.5 to 10% by weight dispersant, from 20% to 70% by weight cosolvent, from 0.01% to 0.2% by weight biocide, from 20% to 50% by weight water, and from 0% to 10% by weight additional modifying components.

11. A stamp pad comprising a porous pad, the porous pad comprising a child and environmentally friendly aqueous based heat transfer disperse dye composition suitable to transfer an image to an intermediate ink receptive surface.

12. The composition according to claim 11, wherein the disperse dye composition has a viscosity more than 10 cps.

13. The composition according to claim 11, wherein a disperse dye within the disperse dye composition has a particle size is less than 350 nm.

14. The composition according to claim 11, wherein the disperse dye composition comprises one or more disperse dyes, dispersants, cosolvents, biocides, pH adjusters, defoamers, surfactants, compatibilizers, or any combination thereof.

15. The composition according to claim 14 where the cosolvent is water miscible and is chosen from the group consisting of alcohols, glycerin, and glycols.

16. The composition according to claim 14 where the cosolvent is selected from the group consisting of polyethylene glycol, polypropylene glycol, and glycerin.

17. The composition according to claim 14, wherein the disperse dye is selected from a group consisting of Disperse Yellow 3, Disperse Yellow 23, Disperse Yellow 27, Disperse Yellow 54, Disperse yellow 82, Disperse Yellow 119, Disperse Orange 1, Disperse Orange 3, Disperse Orange 25, Disperse Red 1, Disperse Red 4, Disperse Red 9, Disperse Red 11, Disperse Red 13, Disperse Red 60, Disperse Violet 1, Disperse Violet 17, Disperse Blue 3, Disperse Blue 14, Disperse Blue 19, Disperse Blue 60, Disperse Blue 72, Disperse Blue 359, Disperse Blue 360, and any combination of two or more thereof.

18. The composition according to claim 11, wherein the disperse dye composition also includes from 0 to 10% of an additional colorant chosen from non sublimable consumer and environmentally friendly dyes and color pigments.

19. A composition according to claim 11, wherein the disperse dye composition meets the standards for child safety use as defined by ASTM-D4236 and EN-71.

20. The composition according to claim 11, wherein the disperse dye composition comprises from 2% to 20% by weight of one or more disperse dyes, from 0.5 to 10% by weight dispersant, from 20% to 70% by weight cosolvent, from 0.01% to 0.2% by weight biocide, from 20% to 50% by weight water, and from 0% to 10% by weight additional modifying components.

\* \* \* \* \*